US012424171B2

(12) United States Patent
Yoon et al.

(10) Patent No.: US 12,424,171 B2
(45) Date of Patent: Sep. 23, 2025

(54) PIXEL AND METHOD OF AGING THE PIXEL

(71) Applicant: Samsung Display Co., Ltd., Yongin-si (KR)

(72) Inventors: Juwon Yoon, Yongin-si (KR); Guanghai Jin, Yongin-si (KR); Junghun Noh, Yongin-si (KR)

(73) Assignee: Samsung Display Co., Ltd., Yongin-si (KR)

( * ) Notice: Subject to any disclaimer, the term of this patent is extended or adjusted under 35 U.S.C. 154(b) by 0 days.

(21) Appl. No.: 18/488,754

(22) Filed: Oct. 17, 2023

(65) Prior Publication Data

US 2024/0312417 A1 Sep. 19, 2024

(30) Foreign Application Priority Data

Mar. 14, 2023 (KR) ........................ 10-2023-0033476

(51) Int. Cl.

*G09G 3/3258* (2016.01)
*G09G 3/3233* (2016.01)
*G09G 3/3291* (2016.01)

(52) U.S. Cl.

CPC ......... *G09G 3/3258* (2013.01); *G09G 3/3233* (2013.01); *G09G 3/3291* (2013.01); *G09G 2300/0819* (2013.01); *G09G 2300/0842* (2013.01); *G09G 2320/043* (2013.01)

(58) Field of Classification Search

CPC .. G09G 3/3258; G09G 3/3233; G09G 3/3291; G09G 2300/0819; G09G 2300/0842; G09G 2320/043

See application file for complete search history.

(56) References Cited

U.S. PATENT DOCUMENTS

| | | | | |
|---|---|---|---|---|
| 5,376,561 | A * | 12/1994 | Vu | H01L 27/1214 438/459 |
| 8,450,121 | B2 | 5/2013 | Chung | |
| 9,786,219 | B2 | 10/2017 | Han | |
| 10,043,444 | B2 | 8/2018 | Park et al. | |
| 10,223,970 | B2 | 3/2019 | Kim | |
| 11,164,526 | B2 | 11/2021 | Kim et al. | |

(Continued)

FOREIGN PATENT DOCUMENTS

| | | |
|---|---|---|
| JP | 2008-058446 A | 3/2008 |
| JP | 2008-151991 A | 7/2008 |

(Continued)

*Primary Examiner* — Christopher E Leiby

(74) *Attorney, Agent, or Firm* — Womble Bond Dickinson (US) LLP

(57) ABSTRACT

The disclosure provides a pixel and a method of aging the pixel for reducing or preventing damage to a display element during aging of a driving transistor, the pixel including a display element including an anode and a cathode, a first transistor configured to control a magnitude of a driving current flowing to the display element in response to a gate-source voltage, the first transistor including a first gate electrode configured to function as a gate of the first transistor, a semiconductor layer, and a second gate electrode in a floating state between the first gate electrode and the semiconductor layer, and a second transistor configured to deliver a first voltage to the first transistor in response to a first scan signal.

9 Claims, 6 Drawing Sheets

(56) References Cited

U.S. PATENT DOCUMENTS

| | | | | |
|---|---|---|---|---|
| 12,193,292 | B2 * | 1/2025 | Wang | H10K 59/131 |
| 2014/0002332 | A1 * | 1/2014 | Huang | G09G 3/3406 345/82 |
| 2014/0218415 | A1 | 8/2014 | Pak | |
| 2018/0144685 | A1 * | 5/2018 | Gong | H10K 59/1213 |

FOREIGN PATENT DOCUMENTS

| | | | |
|---|---|---|---|
| KR | 10-0873705 | B1 | 12/2008 |
| KR | 10-2014-0099077 | A | 8/2014 |
| KR | 10-1603230 | B1 | 3/2016 |
| KR | 10-2017-0078891 | A | 7/2017 |
| KR | 10-2077794 | B1 | 2/2020 |
| KR | 10-2020-0124365 | A | 11/2020 |
| KR | 10-2212772 | B1 | 2/2021 |

* cited by examiner

PIXEL AND METHOD OF AGING THE PIXEL

CROSS-REFERENCE TO RELATED APPLICATION

This application claims priority to, and the benefit of, Korean Patent Application No. 10-2023-0033476, filed on Mar. 14, 2023, in the Korean Intellectual Property Office, the disclosure of which is incorporated by reference herein in its entirety.

BACKGROUND

1. Field

One or more embodiments relate to a pixel and a method of aging the pixel.

2. Description of the Related Art

Display devices are devices for displaying data in a visible manner. Display devices are used as display units of small-sized products, such as mobile phones, and are also used as display units of large-sized products, such as televisions.

Display devices include a plurality of pixels configured to emit light in response to electric signals to display images to the outside. Each pixel includes a display element. For example, an organic light-emitting display device includes an organic light-emitting diode (OLED) as a display element. Generally, in an organic light-emitting device, a thin-film transistor and an OLED is formed on a substrate, and the OLED emits light.

As display devices are used for various purposes, various designs to improve the quality of display devices have been attempted.

SUMMARY

One or more embodiments provide a pixel, and a method of aging the pixel, for reducing or preventing damage to a display element during aging of the driving transistor.

Additional aspects will be set forth in part in the description which follows and, in part, will be apparent from the description, or may be learned by practice of the presented embodiments of the disclosure.

According to one or more embodiments, a pixel includes a display element including an anode and a cathode, a first transistor configured to control a magnitude of a driving current flowing to the display element in response to a gate-source voltage, the first transistor including a first gate electrode configured to function as a gate of the first transistor, a semiconductor layer, and a second gate electrode in a floating state between the first gate electrode and the semiconductor layer, and a second transistor configured to deliver a first voltage to the first transistor in response to a first scan signal.

The pixel may further include a storage capacitor connected to the gate of the first transistor, wherein the second transistor is configured to deliver the first voltage to the gate of the first transistor in response to the first scan signal.

The pixel may further include a third transistor configured to deliver a second voltage to the anode of the display element in response to a second scan signal.

A level of the second voltage may be higher than, or substantially equal to, a level of a voltage applied to the cathode of the display element.

The first transistor, the second transistor, and the third transistor may each include a p-type metal-oxide-semiconductor field effect transistor.

The pixel may further include a substrate, wherein the display element, the first transistor, and the second transistor are above the substrate, wherein the semiconductor layer includes a first conductive area, a second conductive area, and a semiconductor area between the first conductive area and the second conductive area, wherein the first gate electrode is above the semiconductor layer, and at least partially overlaps the semiconductor area, and wherein the second gate electrode is between the first gate electrode and the semiconductor layer, and at least partially overlaps the semiconductor area.

The substrate may include silicon.

According to one or more embodiments, a pixel is connected to a first scan line and to a second scan line that are respectively configured to deliver a first scan signal and a second scan signal, connected to a first voltage line and to a second voltage line that are respectively configured to deliver a first voltage and a second voltage, and connected to a first power line and to a second power line respectively configured to deliver a first driving voltage and a second driving voltage, the pixel including a display element including an anode and a cathode, a storage capacitor including a first electrode connected to the second power line, and a second electrode, a first transistor including a first gate electrode configured to function as a gate connected to the second electrode of the storage capacitor, a semiconductor layer configured to function as a source connected to the first power line and as a drain, and a second gate electrode between the first gate electrode and the semiconductor layer, a second transistor including a gate connected to the first scan line, a source connected to the first voltage line, and a drain connected to the gate of the first transistor, and a third transistor including a gate connected to the second scan line, a source connected to the anode of the display element, and a drain connected to the second voltage line.

The second gate electrode may be in a floating state.

A level of the second voltage may be higher than, or substantially equal to, a level of a third driving voltage applied to the cathode of the display element.

A level of the first driving voltage may be higher than a level of the third driving voltage, wherein a level of the second driving voltage is lower than, or substantially equal to, the level of the first driving voltage.

The pixel may further include a substrate, wherein the display element, the storage capacitor, the first transistor, the second transistor, and the third transistor are above the substrate, wherein the semiconductor layer includes a first conductive area configured to function as one of the source and the drain of the first transistor, a second conductive area configured to function as another of the source and the drain of the first transistor, and a semiconductor area between the first conductive area and the second conductive area, wherein the first gate electrode is above the semiconductor layer, and at least partially overlaps the semiconductor area, and wherein the second gate electrode is between the first gate electrode and the semiconductor layer, and at least partially overlaps the semiconductor area.

The substrate may include silicon.

According to another aspect of the disclosure, there is provided a method of aging a pixel including a display element having an anode and a cathode, a first transistor including a first gate electrode, a first electrode, a second electrode connected to the anode of the display element, and a second gate electrode, and a second transistor including a third gate electrode, a third electrode, and a fourth electrode connected to the anode of the display element, the method including applying a first aging voltage to the first gate electrode of the first transistor, applying a first driving voltage to the first electrode of the first transistor, applying a second driving voltage to the cathode of the display element, applying a turn-on level voltage to the third gate electrode of the second transistor, and applying a second aging voltage to the third electrode of the second transistor.

The second gate electrode may be in a floating state.

A level of the first driving voltage may be higher than a level of the second driving voltage, wherein a level of the second aging voltage is lower than the level of the second driving voltage.

The pixel may further include a third transistor including a fourth gate electrode, a fifth electrode connected to the second electrode of the first transistor, and a sixth electrode, wherein the applying of the first aging voltage to the first gate electrode of the first transistor includes applying a turn-on level voltage to the fourth gate electrode of the third transistor, and applying the first aging voltage to the sixth electrode of the third transistor.

The pixel may further include a storage capacitor including a seventh electrode, and an eighth electrode connected to the first gate electrode of the first transistor, the method further including applying a third driving voltage to the storage capacitor.

A level of the third driving voltage may be lower than a level of the first driving voltage.

The pixel may further include a storage capacitor connected to the first gate electrode of the first transistor, wherein the applying of the first aging voltage to the first gate electrode of the first transistor includes applying the first aging voltage to the storage capacitor.

Other aspects will be clearly understood from detailed descriptions, claims, and accompanying drawings.

These general and specific aspects may be embodied using a system, a method, a computer program, or an arbitrary combination of a system, a method, and a computer program.

BRIEF DESCRIPTION OF THE DRAWINGS

The above and other aspects of embodiments of the disclosure will be more apparent from the following description taken in conjunction with the accompanying drawings, in which.

DETAILED DESCRIPTION

Figure 1:
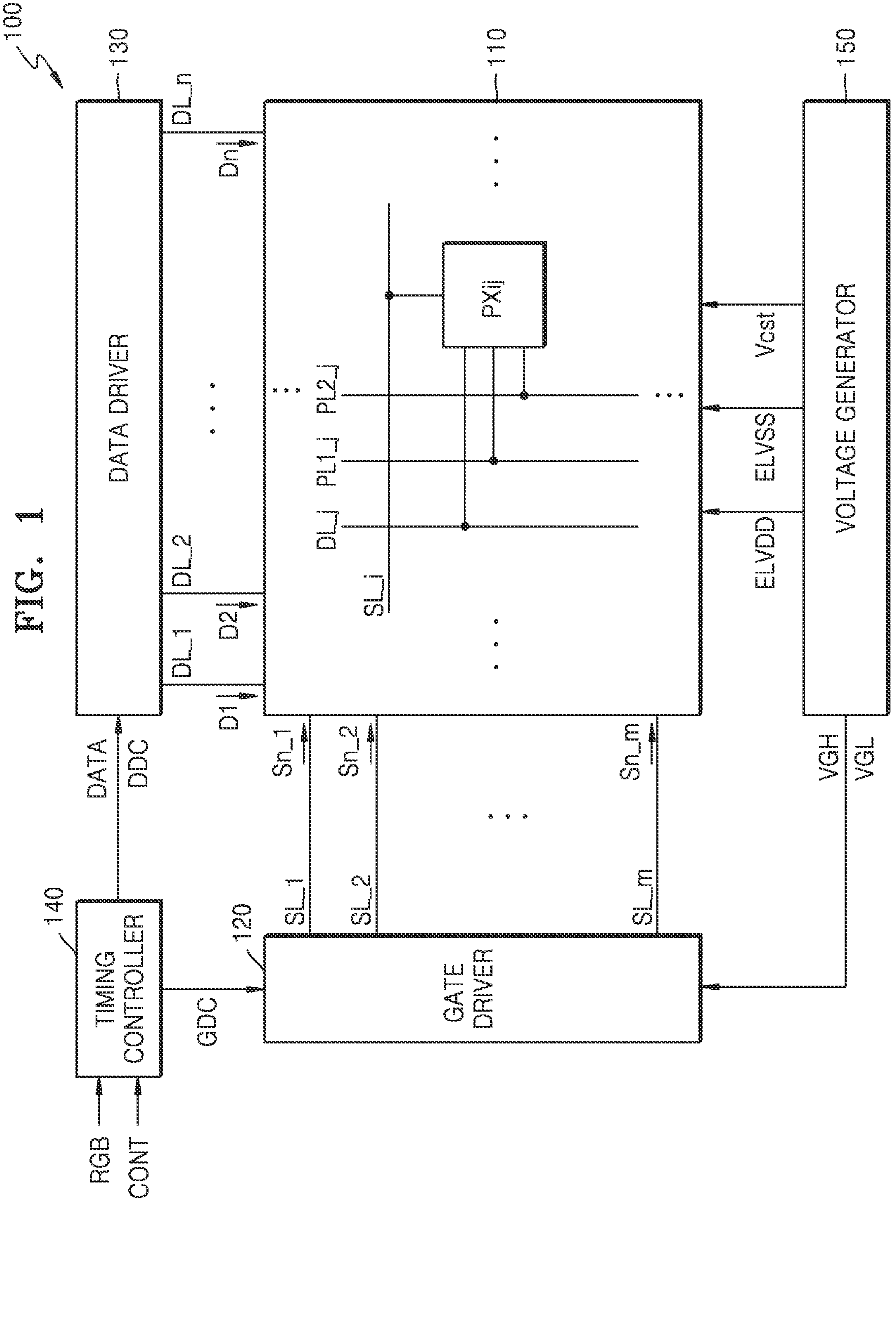
FIG. 1 is a block diagram schematically illustrating a display device according to one or more embodiments.

Aspects of some embodiments of the present disclosure and methods of accomplishing the same may be understood more readily by reference to the detailed description of embodiments and the accompanying drawings. The described embodiments are provided as examples so that this disclosure will be thorough and complete, and will fully convey the aspects of the present disclosure to those skilled in the art. Accordingly, processes, elements, and techniques that are redundant, that are unrelated or irrelevant to the description of the embodiments, or that are not necessary to those having ordinary skill in the art for a complete understanding of the aspects of the present disclosure may be omitted. Unless otherwise noted, like reference numerals, characters, or combinations thereof denote like elements throughout the attached drawings and the written description, and thus, repeated descriptions thereof may be omitted.

The described embodiments may have various modifications and may be embodied in different forms, and should not be construed as being limited to only the illustrated embodiments herein. The present disclosure covers all modifications, equivalents, and replacements within the idea and technical scope of the present disclosure. Further, each of the features of the various embodiments of the present disclosure may be combined or combined with each other, in part or in whole, and technically various interlocking and driving are possible. Each embodiment may be implemented independently of each other or may be implemented together in an association.

In the drawings, the relative sizes of elements, layers, and regions may be exaggerated for clarity and/or descriptive purposes. Additionally, the use of cross-hatching and/or shading in the accompanying drawings is generally provided to clarify boundaries between adjacent elements. As such, neither the presence nor the absence of cross-hatching or shading conveys or indicates any preference or requirement for particular materials, material properties, dimensions, proportions, commonalities between illustrated elements, and/or any other characteristic, attribute, property, etc., of the elements, unless specified.

Various embodiments are described herein with reference to sectional illustrations that are schematic illustrations of embodiments and/or intermediate structures. As such, variations from the shapes of the illustrations as a result, for example, of manufacturing techniques and/or tolerances, are to be expected. Further, specific structural or functional descriptions disclosed herein are merely illustrative for the purpose of describing embodiments according to the concept of the present disclosure. Thus, embodiments disclosed herein should not be construed as limited to the illustrated shapes of elements, layers, or regions, but are to include deviations in shapes that result from, for instance, manufacturing.

For example, an implanted region illustrated as a rectangle will, typically, have rounded or curved features and/or a gradient of implant concentration at its edges rather than a binary change from implanted to non-implanted region. Likewise, a buried region formed by implantation may result in some implantation in the region between the buried region and the surface through which the implantation takes place. In other instances, well-known structures and devices are shown in block diagram form to avoid unnecessarily obscuring various embodiments.

Spatially relative terms, such as "beneath," "below," "lower," "lower side," "under," "above," "upper," "upper side," and the like, may be used herein for ease of explanation to describe one element or feature's relationship to another element(s) or feature(s) as illustrated in the figures. It will be understood that the spatially relative terms are intended to encompass different orientations of the device in use or in operation, in addition to the orientation depicted in the figures. For example, if the device in the figures is turned over, elements described as "below," "beneath," "or "under" other elements or features would then be oriented "above" the other elements or features. Thus, the example terms "below" and "under" can encompass both an orientation of above and below. The device may be otherwise oriented (e.g., rotated 90 degrees or at other orientations) and the spatially relative descriptors used herein should be interpreted accordingly. Similarly, when a first part is described as being arranged "on" a second part, this indicates that the first part is arranged at an upper side or a lower side of the second part without the limitation to the upper side thereof on the basis of the gravity direction.

Further, the phrase "in a schematic cross-sectional view" means when a schematic cross-section taken by vertically cutting an object portion is viewed from the side. The terms "overlap" or "overlapped" mean that a first object may be above or below or to a side of a second object, and vice versa. Additionally, the term "overlap" may include layer, stack, face or facing, extending over, covering, or partly covering or any other suitable term as would be appreciated and understood by those of ordinary skill in the art. The expression "not overlap" may include meaning, such as "apart from" or "set aside from" or "offset from" and any other suitable equivalents as would be appreciated and understood by those of ordinary skill in the art. The terms "face" and "facing" may mean that a first object may directly or indirectly oppose a second object. In a case in which a third object intervenes between a first and second object, the first and second objects may be understood as being indirectly opposed to one another, although still facing each other.

It will be understood that when an element, layer, region, or component is referred to as being "formed on," "on," "connected to," or "(operatively or communicatively) coupled to" another element, layer, region, or component, it can be directly formed on, on, connected to, or coupled to the other element, layer, region, or component, or indirectly formed on, on, connected to, or coupled to the other element, layer, region, or component such that one or more intervening elements, layers, regions, or components may be present. In addition, this may collectively mean a direct or indirect coupling or connection and an integral or non-integral coupling or connection. For example, when a layer, region, or component is referred to as being "electrically connected" or "electrically coupled" to another layer, region, or component, it can be directly electrically connected or coupled to the other layer, region, and/or component or intervening layers, regions, or components may be present. However, "directly connected/directly coupled," or "directly on," refers to one component directly connecting or coupling another component, or being on another component, without an intermediate component. In addition, in the present specification, when a portion of a layer, a film, an area, a plate, or the like is formed on another portion, a forming direction is not limited to an upper direction but includes forming the portion on a side surface or in a lower direction. On the contrary, when a portion of a layer, a film, an area, a plate, or the like is formed "under" another portion, this includes not only a case where the portion is "directly beneath" another portion but also a case where there is further another portion between the portion and another portion. Meanwhile, other expressions describing relationships between components such as "between," "immediately between" or "adjacent to" and "directly adjacent to" may be construed similarly. In addition, it will also be understood that when an element or layer is referred to as being "between" two elements or layers, it can be the only element or layer between the two elements or layers, or one or more intervening elements or layers may also be present.

For the purposes of this disclosure, expressions such as "at least one of," or "any one of," or "one or more of" when preceding a list of elements, modify the entire list of elements and do not modify the individual elements of the list. For example, "at least one of X, Y, and Z," "at least one of X, Y, or Z," "at least one selected from the group consisting of X, Y, and Z," and "at least one selected from the group consisting of X, Y, or Z" may be construed as X only, Y only, Z only, any combination of two or more of X, Y, and Z, such as, for instance, XYZ, XYY, YZ, and ZZ, or any variation thereof. Similarly, the expression such as "at least one of A and B" and "at least one of A or B" may include A, B, or A and B. As used herein, "or" generally means "and/or," and the term "and/or" includes any and all combinations of one or more of the associated listed items. For example, the expression such as "A and/or B" may include A, B, or A and B. Similarly, expressions such as "at least one of," "a plurality of," "one of," and other prepositional phrases, when preceding a list of elements, modify the entire list of elements and do not modify the individual elements of the list.

It will be understood that, although the terms "first," "second," "third," etc., may be used herein to describe various elements, components, regions, layers and/or sections, these elements, components, regions, layers and/or sections should not be limited by these terms. These terms are used to distinguish one element, component, region, layer or section from another element, component, region, layer or section. Thus, a first element, component, region, layer or section described below could be termed a second element, component, region, layer or section, without departing from the spirit and scope of the present disclosure. The description of an element as a "first" element may not require or imply the presence of a second element or other elements. The terms "first," "second," etc. may also be used herein to differentiate different categories or sets of elements. For conciseness, the terms "first," "second," etc. may represent "first-category (or first-set)," "second-category (or second-set)," etc., respectively.

The terminology used herein is for the purpose of describing particular embodiments only and is not intended to be limiting of the present disclosure. As used herein, the singular forms "a" and "an" are intended to include the plural forms as well, while the plural forms are also intended to include the singular forms, unless the context clearly indicates otherwise. It will be further understood that the terms "comprises," "comprising," "have," "having," "includes," and "including," when used in this specification, specify the presence of the stated features, integers, steps, operations, elements, and/or components, but do not preclude the presence or addition of one or more other features, integers, steps, operations, elements, components, and/or groups thereof.

When one or more embodiments may be implemented differently, a specific process order may be performed differently from the described order. For example, two consecutively described processes may be performed substantially at the same time or performed in an order opposite to the described order.

As used herein, the term "substantially," "about," "approximately," and similar terms are used as terms of approximation and not as terms of degree, and are intended to account for the inherent deviations in measured or calculated values that would be recognized by those of ordinary skill in the art. “About” or “approximately,” as used herein, is inclusive of the stated value and means within an acceptable range of deviation for the particular value as determined by one of ordinary skill in the art, considering the measurement in question and the error associated with measurement of the particular quantity (i.e., the limitations of the measurement system). For example, “about” may mean within one or more standard deviations, or within +30%, 20%, 10%, 5% of the stated value. Further, the use of “may” when describing embodiments of the present disclosure refers to “one or more embodiments of the present disclosure.”

Some embodiments are described in the accompanying drawings in relation to functional block, unit, and/or module. Those skilled in the art will understand that such block, unit, and/or module are/is physically implemented by a logic circuit, an individual component, a microprocessor, a hard wire circuit, a memory element, a line connection, and other electronic circuits. This may be formed using a semiconductor-based manufacturing technique or other manufacturing techniques. The block, unit, and/or module implemented by a microprocessor or other similar hardware may be programmed and controlled using software to perform various functions discussed herein, optionally may be driven by firmware and/or software. In addition, each block, unit, and/or module may be implemented by dedicated hardware, or a combination of dedicated hardware that performs some functions and a processor (for example, one or more programmed microprocessors and related circuits) that performs a function different from those of the dedicated hardware. In addition, in some embodiments, the block, unit, and/or module may be physically separated into two or more interact individual blocks, units, and/or modules without departing from the scope of the present disclosure. In addition, in some embodiments, the block, unit and/or module may be physically combined into more complex blocks, units, and/or modules without departing from the scope of the present disclosure.

Unless otherwise defined, all terms (including technical and scientific terms) used herein have the same meaning as commonly understood by one of ordinary skill in the art to which the present disclosure belongs. It will be further understood that terms, such as those defined in commonly used dictionaries, should be interpreted as having a meaning that is consistent with their meaning in the context of the relevant art and/or the present specification, and should not be interpreted in an idealized or overly formal sense, unless expressly so defined herein.

FIG. 1 is a block diagram schematically illustrating a display device according to one or more embodiments.

The display device may include an organic light-emitting display including a display element having luminance changing according to currents, for example, an organic light-emitting diode. Alternatively, the display device may include an inorganic light-emitting display, an inorganic EL display device, or a quantum-dot light-emitting display. Alternatively, the display device may include a micro light-emitting diode (LED) display in which a micro-LED is used as a display element. That is, an emission layer of the display element provided in the display element may include an organic material, may include an inorganic material, may include quantum dots, may include an organic material and quantum dots, may include an inorganic material and quantum dots, or may include an organic material, an inorganic material, and quantum dots. Hereinafter, one or more embodiments in which the display device is an organic light-emitting device will be described in detail.

Referring to FIG. 1, an organic light-emitting device 100 includes a display unit 110, a gate driver 120, a data driver 130, a timing controller 140, and a voltage generator 150.

The display unit 110 includes pixels PX, for example a pixel PXij in an $i^{th}$ column and a $j^{th}$ row. Although only one pixel PXij is shown in FIG. 1 for convenience of understanding, m×n pixels PX may be arranged in the form of, for example, a matrix. Here, i is a natural number equal to or greater than 1 and equal to or less than m, and j is a natural number equal to or greater than 1 and equal to or less than n.

The pixels PX are connected to scan lines SL_1 to SL_m and to data lines DL_1 to DL_n. The pixels PX are connected to first power lines PL1_1 to PL1_*n* and to second power lines PL2_1 to PL2_*n*. For example, as described above, the pixel PXij may be connected to a scan line SL_i, a data line DL_j, a first power line PL1_*j*, and a second power line PL2_*j*.

The scan lines SL_1 to SL_m may extend in a first direction (e.g., a row direction) and may be connected to the pixels PX in a same row. The data lines DL_1 to DL_n, the first power lines PL1_1 to PL1_*n*, and the second power lines PL2_1 to PL2_*n* may extend in a second direction (e.g., a column direction) and may be connected to the pixels PX in a same column.

The scan lines SL_1 to SL_m are respectively configured to deliver scan signals Sn_1 to Sn_m, which are output from the gate driver 120, to pixels PX in a same row. The data lines DL_1 to DL_n are respectively configured to deliver data voltages D1 to Dn, which are output from the data driver 130, to pixels PX in a same column. The pixel PXij receives a scan signal Sn_i and a data voltage Dj.

The first power lines PL1_1 to PL1_*n* are respectively configured to deliver a first driving voltage ELVDD, which is output from the voltage generator 150, to pixels PX in a same column. The second power lines PL2_1 to PL2_*n* are respectively configured to deliver a second driving voltage Vcst, which is output from the voltage generator 150, to pixels PX in a same column.

The pixel PXij may include a display element and a driving transistor configured to control a magnitude of a driving current flowing to the display element based on the data voltage Dj. The data voltage Dj is output from the data driver 130, and is received from the pixel PXij through the data line DL_j. The display element may include, for example, an organic light-emitting diode. As the display element emits light having a luminance corresponding to the magnitude of the driving current received from the driving transistor, the pixel PXij may express a grayscale according to the data voltage Dj.

The pixel PX may correspond to a portion of a unit pixel by which full colors may be displayed, for example, a subpixel. The pixel PXij may further include at least one switching transistor and at least one capacitor. The pixel PXij will be described in further detail with reference to FIG. 2.

The voltage generator 150 may be configured to generate voltages for the pixel PXij to operate. For example, the voltage generator 150 may be configured to generate the first driving voltage ELVDD, the second driving voltage Vcst, and a third driving voltage ELVSS. A level of the first driving voltage ELVDD may be higher than a level of the third driving voltage ELVSS. A level of the second driving voltage Vcst may be lower than or substantially equal to the level of the first driving voltage ELVDD.

The voltage generator 150 may be configured to generate a first gate voltage VGH and a second gate voltage VGL for controlling the switching transistor of the pixel PXij, and to provide the first gate voltage VGH and the second gate voltage VGL to the gate driver 120. The switching transistor may be turned off when the first gate voltage VGH is applied to a gate of the switching transistor, and the switching transistor may be turned on when the second gate voltage VGL is applied to a gate of the switching transistor. The first gate voltage VGH may be referred to as a gate off voltage, and the second gate voltage VGL may be referred to as a gate on voltage. The switching transistors of the Pixel PXij may include p-type metal-oxide-semiconductor field-effect transistors (MOSFET), and a level of the first gate voltage VGH may be higher than a level of the second gate voltage VGL. In one or more embodiments, the voltage generator 150 may be configured to generate gamma reference voltages, and to provide the gamma reference voltages to the data driver 130.

The timing controller 140 may be configured to control the display unit 110 by controlling operation timings of the gate driver 120 and the data driver 130. The pixels PX of the display unit 110 may receive new data voltages D1 to Dn for new frame periods, and may emit light in luminance corresponding to the data voltages D1 to Dn, thereby displaying images corresponding to image source data RGB of a frame.

According to one or more embodiments, a frame period may include a data write period and an emission period. In the data write period, the data voltages D1 to Dn may be provided to the pixels PX in synchronization with the scan signal Sn. In the emission period, the pixels PX in the display unit 110 may emit light.

The timing controller 140 is configured to receive the image source data RGB and a control signal CONT from the outside. The timing controller 140 may be configured to convert the image source data RGB to image data DATA, based on characteristics of the display unit 110 and the pixels PX. The timing controller 140 may be configured to provide the image data DATA to the data driver 130.

The control signal CONT may include at least one of a vertical synchronizing signal, a horizontal synchronizing signal, a data enable signal, and a clock signal. The timing controller 140 may configured to control operation timings of the gate driver 120 and the data driver 130 by using the control signal CONT.

The timing controller 140 may be configured to determine a frame period by counting the data enable signal for one horizontal scanning period (1H). In this case, the vertical synchronizing signal and the horizontal synchronizing signal provided from the outside may be omitted. The image source data RGB may include information regarding the luminance of the pixels PX. The luminance may have a grayscale of a preset numbers (e.g., 1024 (which is equal to $2^{10}$), 256 (which is equal to $2^{8}$), or 64 (which is equal to $2^{6}$)).

The timing controller 140 may be configured to generate control signals including a gate-timing-control signal GDC for controlling an operation timing of the gate driver 120, and a data-timing-control signal DDC for controlling an operation timing of the data driver 130.

The gate-timing-control signal GDC may include a gate start pulse, a gate shift clock, a gate output enable signal, and the like. The gate start pulse is provided to the gate driver 120, which is configured to generate a first scan signal at a point where a scan period begins. The gate shift clock, which is a clock signal input in common to the gate driver 120, is a clock signal for shifting the gate start pulse. The gate output enable signal controls output of the gate driver 120.

The data-timing-control signal DDC may include a source start pulse, a source sampling clock, a source output enable signal, and the like. The source start pulse controls a point at which the data driver 130 starts data sampling, and is provided to the data driver 130 at the point where the scan period starts. The source sampling clock is a clock signal for controlling data sampling operations in the data driver 130 with reference to rising edges or falling edges. The source output enable signal controls output from the data driver 130. The source start pulse provided to the data driver 130 may be omitted according to a data transmission method.

The gate driver 120 sequentially generates the scan signals Sn_1 to Sn_m in response to the gate-timing-control signal GDC provided from the timing controller 140 by using the first gate voltage VGH and the second voltage VGL provided from the voltage generator 150.

The data driver 130 samples and latches the image data DATA provided from the timing controller 140, and converts the data in a parallel data system, in response to the data-timing-control signal DDC provided from the timing controller 140. When the data driver 130 converts the image data DATA to the data in the parallel data system, the data driver 130 converts the image data DATA to a gamma reference voltage, and then to an analog data voltage. The data driver 130 is configured to provide the data voltage D1 to Dn to the pixels PX through the data lines DL_1 to DL_n. The pixels PX receive the data voltage D1 to Dn in response to the scan signals Sn_1 to Sn_m.

Figure 2:
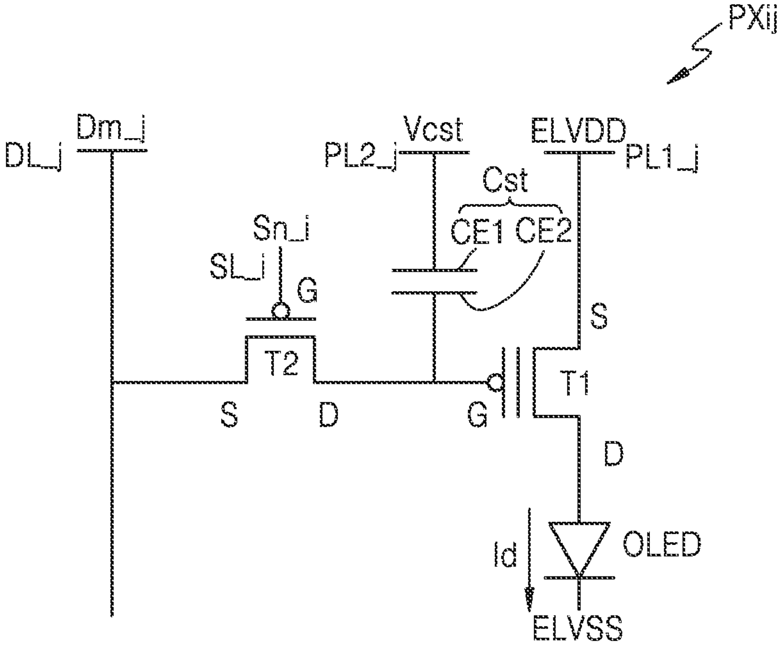
FIG. 2 shows a pixel circuit of the pixel according to one or more embodiments.

FIG. 2 shows a pixel circuit of the pixel PXij according to one or more embodiments.

Referring to FIG. 2, the pixel PXij is connected to the scan line SL_i configured to deliver the scan signal Sn_i, and to the data line DL_j configured to deliver a data voltage Dm_j. The pixel PXij is connected to the first power line PL1_*j* configured to deliver the first driving voltage ELVDD, and is connected to the second power line PL2_*j* configured to deliver the second driving voltage Vcst. The pixel PXij is connected to a common electrode to which the third driving voltage ELVSS is applied. The pixel PXij may correspond to the pixel PXij shown in FIG. 1.

The pixel PXij includes a display element OLED, a first transistor T1, a second transistor T2, and a storage capacitor Cst. The display element OLED may include an organic light-emitting diode (e.g., a display element) having an anode and a cathode. The cathode may include the common electrode to which the third driving voltage ELVSS is applied. The storage capacitor Cst may include a first storage electrode (or a first electrode) CE1 and a second storage electrode (or a second electrode) CE2.

The first transistor T1 may include a driving transistor in which a magnitude of a source-drain current is determined according to a gate-source voltage, and the second transistor T2 may include a switching transistor being turned on/turned off in response to the gate-source voltage, substantially, a gate voltage. The second transistor T2 may include one switching transistor, or may include a plurality of switching transistors concurrently or substantially simultaneously controlled in response to a same gate signal, and serially connected to each other. The first transistor T1 and the second transistor T2 may be each formed into a thin-film transistor. The first transistor T1 and the second transistor T2 may each include a p-type MOSFET.

The first transistor T1 may be configured to control a magnitude of a driving current Id flowing from the first power line PL1_*j* to the display element OLED in response to the gate-source voltage. The first transistor T1 may include a gate G connected to the second storage electrode CE2 of the storage capacitor Cst, a source S connected to the first power line PL1_*j*, and a drain D connected to the anode of the display element OLED.

Figure 3:
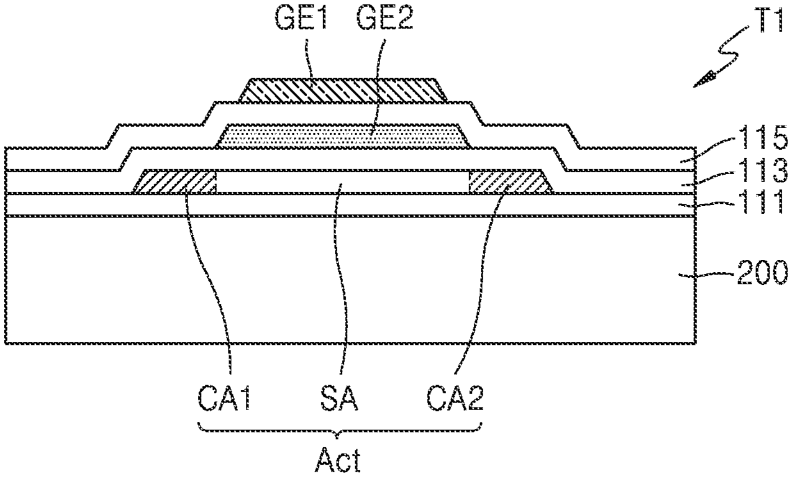
FIG. 3 is a cross-sectional view schematically illustrating a driving transistor according to one or more embodiments.

As shown in FIG. 3 to be described further later, the first transistor T1 may include a first gate electrode GE1 having a function of the gate G, a semiconductor layer Act, and a second gate electrode GE2 between the first gate electrode GE1 and the semiconductor layer Act. The second gate electrode GE2 may be in a floating state. Details thereof will be further described with reference to FIG. 3.

The first transistor T1 may be configured to output the driving current Id to the display element OLED. The magnitude of the driving current Id may be determined based on the gate-source voltage of the first transistor T1. The gate-source voltage of the first transistor T1 corresponds to a difference between the gate voltage and a source voltage. For example, the magnitude of the driving current Id may be determined based on a difference between the gate-source voltage of the first transistor T1 and a threshold voltage of the first transistor T1. The display element OLED may be configured to receive the driving current Id from the first transistor T1, and may emit light with a luminance according to the magnitude of the driving current Id.

The second transistor T2 is configured to receive the data voltage Dm_j in response to the scan signal Sn_i. The second transistor T2 is configured to deliver the data voltage Dm_j to the gate G of the first transistor T1 in response to the scan signal Sn_i. The second transistor T2 may include a gate G connected to the scan line SL_i, a source S connected to the data line DL_j, and a drain connected to the gate G of the first transistor T1.

The storage capacitor Cst is connected to the gate G of the first transistor T1. The storage capacitor Cst may be connected between the second power line PL2_*j* and the gate G of the first transistor T1. The storage capacitor Cst may have the first storage electrode CE1 connected to the second power line PL2_*j*, and the second storage electrode CE2 connected to the gate G of the first transistor T1. The storage capacitor Cst may be configured to store a difference between the second driving voltage Vcst applied to the second power line PL2_*j* and a gate voltage of the first transistor T1, and may also be configured to maintain the gate voltage of the first transistor T1.

FIG. 3 is a cross-sectional view schematically illustrating a driving transistor according to one or more embodiments.

Referring to FIG. 3, the first transistor T1 may be located on a substrate 200. The first transistor T1 may include the first gate electrode GE1 configured to function as the gate G (see FIG. 2), the semiconductor layer Act, and the second gate electrode GE2 between the first gate electrode GE1 and the semiconductor layer Act. The second gate electrode GE2 may be in a floating state.

The semiconductor layer Act may include a first conductive area CA1, a second conductive area CA2, and a semiconductor area SA between the first conductive area CA1 and the second conductive area CA2. The first conductive area CA1 may function as one of the source S (see FIG. 2) and the drain D (see FIG. 2) of the first transistor T1. The second conductive area CA2 may function as the other one of the source S and the drain D of the first transistor T1.

Hereinafter, components included in the first transistor T1 will be described in further detail according to a stack order with reference to FIG. 3.

The substrate 200 may include glass, ceramic, metal, or a flexible or bendable material. When the substrate 200 is flexible or bendable, the substrate 200 may include a polymer resin, such as polyethersulfone, polyacrylate, polyetherimide, polyethylene naphthalate, polyethylene terephthalate, polyphenylene sulfide, polyarylate, polyimide, polycarbonate, or cellulose acetate propionate.

The substrate 200 may have a single-layer structure or a multilayer structure including the aforementioned materials, and the multilayer structure may further include an inorganic layer. In some embodiments, the substrate 200 may have a structure including organic material/inorganic material/organic material.

In one or more embodiments, the substrate 200 may include silicon.

Although FIG. 3 illustrates that the first transistor T1 is located on the substrate 200, the display element OLED, the second transistor T2, and the storage capacitor Cst shown in FIG. 2 described above may also be located on the substrate 200.

A buffer layer 111 may be located on the substrate 200. The buffer layer 111 may reduce or prevent diffusion of impurity ions and permeation of moisture or external air, and may provide a planarized surface. In one or more embodiments, a barrier layer may be further included between the substrate 200 and the buffer layer 111. The barrier layer may reduce, prevent, or minimize permeation of impurities from the substrate 200 and the like into the semiconductor layer Act. The barrier layer may include an inorganic material, such as an oxide or a nitride, an organic material, or an organic-inorganic complex, and may have a single-layer structure or a multilayer structure including an inorganic material and an organic material.

The semiconductor layer Act may be located on the buffer layer 111. The semiconductor layer Act may include the semiconductor area SA in which a channel is formed, and the first conductive area CA1 and the second conductive area CA2 located at two sides of the semiconductor area SA. The first conductive area CA1 and the second conductive area CA2 may include areas doped with impurities. The semiconductor layer Act may include an amorphous silicon or polysilicon. As one or more other embodiments, the semiconductor layer Act may include an oxide of at least one material selected from among a group including indium (In), gallium (Ga), stannum (Sn), zirconium (Zr), vanadium (V), hafnium (Hf), cadmium (Cd), germanium (Ge), chromium (Cr), titanium (Ti), aluminum (Al), cesium (Cs), cerium (Ce), and/or zinc (Zn). For example, the semiconductor layer Act may include an InSnZnO (ITZO) semiconductor layer, an InGaZnO (IGZO) semiconductor layer, and/or the like.

A first gate insulating layer 113 located on the semiconductor layer Act may include silicon oxide ($SiO_2$), silicon nitride ($SiN_x$), silicon oxynitride (SiON), aluminum oxide ($Al_2O_3$), titanium oxide ($TiO_2$), tantalum oxide ($Ta_2O_5$), hafnium oxide ($HfO_2$), zinc oxide ($ZnO_2$), and/or the like.

The second gate electrode GE2 may be located on the first gate insulating layer 113. The second gate electrode GE2 may at least partially overlap the semiconductor layer Act. The second gate electrode GE2 may at least partially overlap the semiconductor area SA. The second gate electrode GE2 may include a single layer or a multilayer including one or more metals selected from among aluminum (Al), platinum (Pt), palladium (Pd), silver (Ag), magnesium (Mg), gold (Au), nickel (Ni), neodymium (Nd), iridium (Ir), chromium (Cr), lithium (Li), calcium (Ca), molybdenum (Mo), titanium (Ti), tungsten (W), and/or copper (Cu).

A second gate insulating layer 115 may be located on the second gate electrode GE2. The second gate insulating layer 115 may include $SiO_2$, $SiN_x$, SiON, $Al_2O_3$, $TiO_2$, $Ta_2O_5$, $HfO_2$, $ZnO_2$, and/or the like.

The first gate electrode GE1 may be located on the second gate insulating layer 115. The first gate electrode GE1 may at least partially overlap the semiconductor layer Act. The first gate electrode GE1 may at least partially overlap the semiconductor area SA. The first gate electrode GE1 may function as the gate electrode of the first transistor T1. The first gate electrode GE1 may include a single layer or a multilayer including one or more metals selected from among Al, Pt, Pd, Ag, Mg, Au, Ni, Nd, Ir, Cr, Li, Ca, Mo, Ti, W, and/or Cu.

Figure 4:
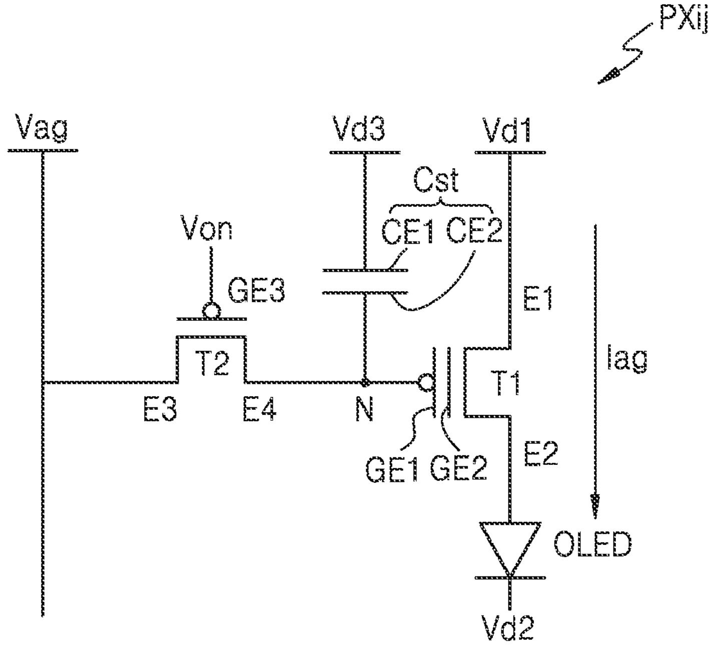
FIG. 4 shows a method of aging the pixel circuit shown in FIG. 2.

FIG. 4 shows a method of aging the pixel circuit shown in FIG. 2. The method of aging the pixel circuit shown in FIG. 4 may be included in a process of manufacturing a display device.

Referring to FIG. 4, the first transistor T1 may include the first gate electrode GE1, a first electrode E1, a second electrode E2 connected to the anode of the display element OLED, and the second gate electrode GE2. The second gate electrode GE2 may be in a floating state. The first gate electrode GE1 corresponds to the gate G of the first transistor T1 shown in FIG. 2, the first electrode E1 corresponds to the source S of the first transistor T1 shown in FIG. 2, and the second electrode E2 corresponds to the drain D of the first transistor T1 shown in FIG. 2.

The second transistor T2 may include a third gate electrode GE3, a third electrode E3, and a fourth electrode E4 connected to the first gate electrode GE1 of the first transistor T1. The third gate electrode GE3 corresponds to the gate G of the second transistor T2 shown in FIG. 2, the third electrode E3 corresponds to the source S of the second transistor T2 shown in FIG. 2, and the fourth electrode E4 corresponds to the drain D of the second transistor T2 shown in FIG. 2.

A first driving voltage Vd1 may be applied to the first electrode E1 of the first transistor T1, a second driving voltage Vd2 may be applied to the cathode of the display element OLED, and a third driving voltage Vd3 may be applied to the first storage electrode CE1 of the storage capacitor Cst.

In one or more embodiments, a level of the first driving voltage Vd1 may be higher than a level of the second driving voltage Vd2.

In one or more embodiments, a level of the third driving voltage Vd3 may be lower than the level of the first driving voltage Vd1. The level of the third driving voltage Vd3 may be similar to a level of an aging voltage Vag to be described later. In this case, while aging the first transistor T1, damage to the storage capacitor Cst may be reduced or prevented.

The aging voltage Vag may be applied to the first gate electrode GE1 of the first transistor T1. For example, as shown in FIG. 4, a turn-on level voltage Von may be applied to the third gate electrode GE3 of the second transistor T2, and the aging voltage Vag may be applied to the third electrode E3 of the second transistor T2.

Although FIG. 4 illustrates that the second transistor T2 delivers the aging voltage Vag to the first gate electrode GE1 (e.g., an N node) of the first transistor T1 in response to the turn-on level voltage Von, as one or more other embodiments, the aging voltage Vag may be applied to the first gate electrode GE1 (e.g., the N node) of the first transistor T1 through the storage capacitor Cst. For example, the aging voltage Vag may be applied to the first storage electrode CE1 of the storage capacitor Cst.

As the aging voltage Vag is applied to the first gate electrode GE1 of the first transistor T1, an aging current Iag flows from the first electrode E1 of the first transistor T1 to the display element OLED. When the aging voltage Vag is applied to the first gate electrode GE1 of the first transistor T1, carriers (e.g., cations) in the semiconductor area SA (see FIG. 3) in the semiconductor layer Act (see FIG. 3) may be tunneled through the second gate electrode GE2 of the first transistor T1 in the floating state, and the threshold voltage of the first transistor T1 may be adjusted. For example, an amount of a charge undergoing tunneling through the second gate electrode GE2 when the aging voltage Vag is applied to the first gate electrode GE1 is based on an amount of the carriers in the semiconductor area SA, and an amount in which the threshold voltage of the first transistor T1 is shifted is adjusted. Accordingly, as the first transistor T1 is aged, a distribution in the threshold voltage of the first transistor T1 decreases.

Figure 5:
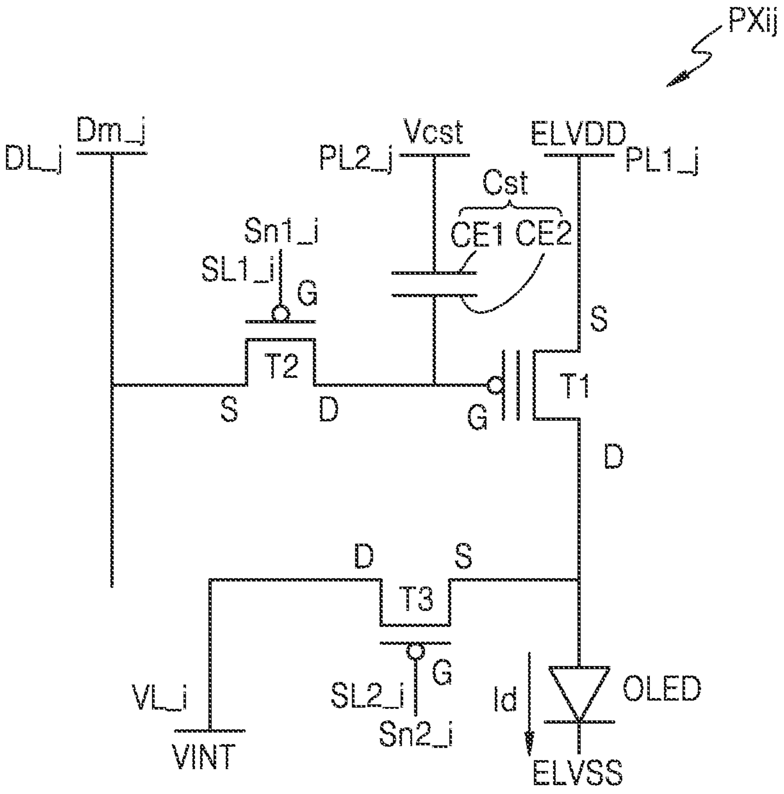
FIG. 5 shows a pixel circuit of the pixel according to one or more other embodiments.

FIG. 5 shows a pixel circuit of the pixel PXij according to one or more other embodiments.

Referring to FIG. 5, the pixel PXij is connected to a first scan line SL1_*i* and a second scan line SL2_*i* respectively configured to deliver a first scan signal Sn1_*i* and a second scan signal Sn2_*i*, is connected to the data line (or a first voltage line) DL_j configured to deliver the data voltage (or a first voltage) Dm_j, and is connected to an initialization line (or a second voltage line) VL_i configured to deliver an initialization voltage (or a second voltage) VINT. The pixel PXij is connected to the first power line PL1_*j* configured to deliver the first driving voltage ELVDD, and is connected to the second power line PL2_*j* configured to deliver the second driving voltage Vcst. The pixel PXij is connected to a common electrode to which the third driving voltage ELVSS is applied.

The pixel PXij includes the display element OLED, a first transistor T1, a second transistor T2, a third transistor T3, and the storage capacitor Cst. The display element may include an organic light-emitting diode having an anode and a cathode. The cathode may include the common electrode to which the third driving voltage ELVSS is applied. The storage capacitor Cst may include a first storage electrode (or a first electrode) CE1 and a second storage electrode (or a second electrode) CE2.

The first transistor T1 may include a driving transistor in which a magnitude of the source-drain current is determined based on the gate-source voltage, and the second transistor T2 and the third transistor T3 may each include a switching transistor turned on/turned off in response to the gate-source voltage, substantially, to the gate voltage. The second transistor T2 and the third transistor T3 may be configured as a switching transistor, or may be configured as a plurality of switching transistors concurrently or substantially simultaneously controlled in response to a same gate signal and serially connected to each other. The first transistor T1, the second transistor T2, and the third transistor T3 may each be formed into a thin-film transistor. The first transistor T1, the second transistor T2, and the third transistor T3 may each include a p-type MOSFET.

The first transistor T1 may be configured to control a magnitude of a driving current Id flowing from the first power line PL1_*j* to the display element OLED in response to the gate-source voltage. The first transistor T1 may include a gate G connected to the second storage electrode CE2 of the storage capacitor Cst, a source S connected to the first power line PL1_*j*, and a drain D connected to the anode of the display element OLED.

As shown in FIG. 3, the first transistor T1 may include the first gate electrode GE1 having the function of the gate G, the semiconductor layer Act, and the second gate electrode GE2 between the first gate electrode GE1 and the semiconductor layer Act. The second gate electrode GE2 may be in a floating state.

The first transistor T1 may output the driving current Id to the display element OLED. The magnitude of the driving current Id may be determined based on the gate-source voltage of the first transistor T1. The gate-source voltage of the first transistor T1 corresponds to a difference between the gate voltage and a source voltage. For example, the magnitude of the driving current Id may be determined based on a difference between the gate-source voltage of the first transistor T1 and a threshold voltage of the first transistor T1. The display element OLED may be configured to receive the driving current Id from the first transistor T1, and may emit light with a luminance according to the magnitude of the driving current Id.

The second transistor T2 is configured to receive the data voltage Dm_j in response to the first scan signal Sn1_*i*. The second transistor T2 is configured to deliver the data voltage Dm_j to the gate G of the first transistor T1 in response to the first scan signal Sn1_*i*. The second transistor T2 may have a gate G connected to a first scan line SL1_*i*, a source S connected to the data line DL_j, and a drain D connected to the gate G of the first transistor T1.

The third transistor T3 is configured to receive the initialization voltage VINT in response to the second scan signal Sn2_*i*. The third transistor T3 is configured to deliver the initialization voltage VINT to the anode of the display element OLED in response to the second scan signal Sn2_*i*. The third transistor T3 may have a gate G connected to a second scan line SL2_*i*, a source S connected to the anode of the display element OLED, and a drain D connected to the initialization line VL_i.

In one or more embodiments, a level of the initialization voltage VINT may be higher than or substantially equal to the level of the third driving voltage ELVSS. For example, a difference between the level of the initialization voltage VINT and the level of the third driving voltage ELVSS may be less than a threshold voltage for the display element OLED to emit light.

The storage capacitor Cst is connected to the gate G of the first transistor T1. The storage capacitor Cst may be connected between the second power line PL2_*j* and the gate G of the first transistor T1. The storage capacitor Cst may have the first storage electrode CE1 connected to the second power line PL2_*j* and the second storage electrode CE2 connected to the gate G of the first transistor T1. The storage capacitor Cst may be configured to store a difference between the second driving voltage Vcst applied to the second power line PL2_*j* and a gate voltage of the first transistor T1, and may also be configured to maintain the gate voltage of the first transistor T1.

Figure 6:
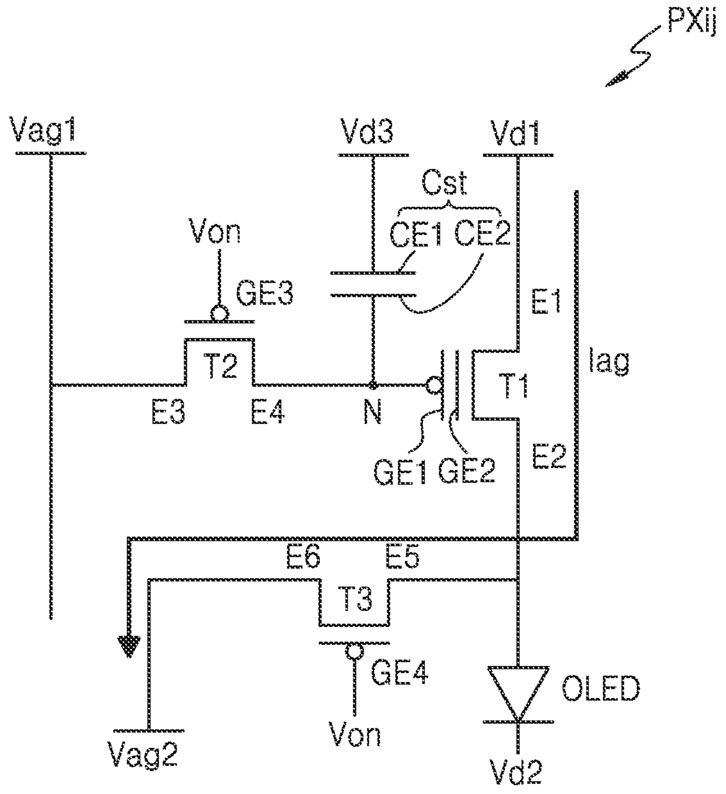
FIG. 6 shows a method of aging the pixel circuit shown in FIG. 5.

FIG. 6 shows a method of aging the pixel circuit shown in FIG. 5. The method of aging the pixel circuit shown in FIG. 6 may be included in a process of manufacturing the display device.

Referring to FIG. 6, the first transistor T1 may include the first gate electrode GE1, the first electrode E1, the second electrode E2 connected to the anode of the display element OLED, and the second gate electrode GE2. The second gate electrode GE2 may be in a floating state. The first gate electrode GE1 corresponds to the gate G of the first transistor T1 shown in FIG. 5, the first electrode E1 corresponds to the source S of the first transistor T1 shown in FIG. 5, and the second electrode E2 corresponds to the drain D of the first transistor T1 shown in FIG. 5.

The second transistor T2 may include a third gate electrode GE3, a third electrode E3, and a fourth electrode E4 connected to the first gate electrode GE1 of the first transistor T1. The third gate electrode GE3 corresponds to the gate G of the second transistor T2 shown in FIG. 5, the third electrode E3 corresponds to the source S of the second transistor T2 shown in FIG. 5, and the fourth electrode E4 corresponds to the drain D of the second transistor T2 shown in FIG. 5.

The third transistor T3 may include a fourth gate electrode GE4, a fifth electrode E5 connected to the anode of the display element OLED, and a sixth electrode E6. The fourth gate electrode GE4 corresponds to the gate G of the third transistor T3 shown in FIG. 5, the fifth electrode E5 corresponds to the source S of the third transistor T3 shown in FIG. 5, and the sixth electrode E6 corresponds to the drain D of the third transistor T3 shown in FIG. 5.

A first driving voltage Vd1 may be applied to the first electrode E1 of the first transistor T1, a second driving voltage Vd2 may be applied to the cathode of the display element OLED, and a third driving voltage Vd3 may be applied to the first storage electrode CE1 of the storage capacitor Cst.

In one or more embodiments, a level of the first driving voltage Vd1 may be higher than a level of the second driving voltage Vd2.

In one or more embodiments, a level of the third driving voltage Vd3 may be lower than the level of the first driving voltage Vd1. The level of the third driving voltage Vd3 may be similar to a level of a first aging voltage Vag1 to be described later. In this case, while aging the first transistor T1, damages to the storage capacitor Cst may be reduced or prevented.

The first aging voltage Vag1 may be applied to the first gate electrode GE1 of the first transistor T1. For example, as shown in FIG. 6, the turn-on level voltage Von may be applied to the third gate electrode GE3 of the second transistor T2, and the first aging voltage Vag1 may be applied to the third electrode E3 of the second transistor T2.

Although FIG. 6 illustrates that the second transistor T2 is configured to deliver the first aging voltage Vag1 to the first gate electrode GE1 (e.g., the N node) of the first transistor T1 in response to the turn-on level voltage Von, as one or more other embodiments, the first aging voltage Vag1 may be applied to the first gate electrode GE1 (e.g., the N node) of the first transistor T1 through the storage capacitor Cst. For example, the first aging voltage Vag1 may be applied to the first storage electrode CE1 of the storage capacitor Cst.

The turn-on level voltage Von may be applied to the fourth gate electrode GE4 of the third transistor T3, and a second aging voltage Vag2 may be applied to the sixth electrode E6 of the third transistor T3. In one or more embodiments, a level of the second aging voltage Vag2 may be lower than the level of the second driving voltage Vd2. In this case, as the first aging voltage Vag1 is applied to the first gate electrode GE1 of the first transistor T1, an aging current Iag flows from the first electrode E1 of the first transistor T1 to the third transistor T3. That is, the aging current Iag does not flow to the display element OLED. Accordingly, during the aging of the first transistor T1, damages to the display element OLED may be reduced or prevented.

Although the pixel and the display device have been mainly described, the disclosure is not limited thereto. For example, a method of manufacturing the pixel and a method of manufacturing the display device also belong to the scope of the disclosure.

As described above, according to one or more embodiments of the disclosure, a pixel and a method of aging the pixel for reducing or preventing the likelihood of damage to a display element during aging of a driving transistor may be implemented. The scope of the disclosure is not limited thereto.

It should be understood that embodiments described herein should be considered in a descriptive sense only and not for purposes of limitation. Descriptions of features or aspects within each embodiment should typically be considered as available for other similar features or aspects in other embodiments. While one or more embodiments have been described with reference to the figures, it will be understood by those of ordinary skill in the art that various changes in form and details may be made therein without departing from the spirit and scope as defined by the following claims, with functional equivalents thereof to be included therein.

What is claimed is:

1. A method of aging a pixel comprising: a display element having an anode and a cathode; a first transistor having a semiconductor layer, a first gate electrode configured to function as a gate of the first transistor, a second gate electrode in a floating state between the first gate electrode and the semiconductor layer, a first electrode, and a second electrode connected to the anode of the display element; a storage capacitor having a first storage electrode, and a second storage electrode connected to the first gate electrode of the first transistor; and a second transistor comprising a third gate electrode, a third electrode connected to a data line, and a fourth electrode connected to the first gate electrode of the first transistor, the method comprising:

applying a first driving voltage to the first electrode of the first transistor;

applying a second driving voltage to the cathode of the display element, wherein a level of the first driving voltage is higher than a level of the second driving voltage;

applying a first aging voltage to the first gate electrode of the first transistor such that carriers in the semiconductor layer tunnel through the second gate electrode to adjust a threshold voltage of the first transistor; and applying a third driving voltage, which is the same as the first aging voltage, from a voltage source directly connected to the first storage electrode of the storage capacitor to reduce a voltage across the storage capacitor to reduce damage to the storage capacitor during application of the first aging voltage for aging the first transistor to the second storage electrode of the storage capacitor, wherein a level of the third driving voltage is lower than the level of the first driving voltage, wherein the applying of the first driving voltage to the first electrode of the first transistor, the applying of the second driving voltage to the cathode of the display element, the applying of the first aging voltage to the first gate electrode of the first transistor, and the applying of the third driving voltage to the first storage electrode of the storage capacitor are performed concurrently.

2. The method of claim 1, wherein the applying of the first aging voltage to the first gate electrode of the first transistor comprises:

applying a turn-on level voltage to the third gate electrode of the second transistor; and applying the first aging voltage to the data line.

3. The method of claim 1, wherein the first transistor is configured to control a magnitude of a driving current flowing to the display element in response to a gate-source voltage.

4. The method of claim 1, wherein the first gate electrode is above the semiconductor layer, and at least partially overlaps a channel area of the semiconductor layer, and wherein the second gate electrode is between the first gate electrode and the channel area of the semiconductor layer, and at least partially overlaps channel area of the semiconductor layer.

5. A method of aging a pixel comprising: a display element having an anode and a cathode; a first transistor having a semiconductor layer, a first gate electrode configured to function as a gate of the first transistor, a second gate electrode in a floating state between the first gate electrode and the semiconductor layer, a first electrode, and a second electrode connected to the anode of the display element; a storage capacitor having a first storage electrode, and a second storage electrode connected to the first gate electrode of the first transistor; a second transistor comprising a third gate electrode, a third electrode connected to a data line, and a fourth electrode connected to the first gate electrode of the first transistor; and a third transistor comprising a fourth gate electrode, a fifth electrode connected to the anode of the display element, and a sixth electrode, the method comprising:

applying a first driving voltage to the first electrode of the first transistor;

applying a second driving voltage to the cathode of the display element, wherein a level of the first driving voltage is higher than a level of the second driving voltage;

applying a first aging voltage to the first gate electrode of the first transistor to generate an aging current through the first transistor such that carriers in the semiconductor layer tunnel through the second gate electrode to adjust a threshold voltage of the first transistor;

applying a second aging voltage to the anode of the display element through the third transistor which is turned on, not to flow the aging current through the display element, wherein a level of the second aging voltage is lower than the level of the second driving voltage; and applying a third driving voltage, which is the same as the first aging voltage, from a voltage source directly connected to the first storage electrode of the storage capacitor to reduce a voltage across the storage capacitor to reduce damage to the storage capacitor during application of the first aging voltage for aging of the first transistor to the second storage electrode of the storage capacitor, wherein a level of the third driving voltage is lower than the level of the first driving voltage, wherein the applying of the first driving voltage to the first electrode of the first transistor, the applying of the second driving voltage to the cathode of the display element, the applying of the first aging voltage to the first gate electrode of the first transistor, the applying of the second aging voltage to the anode of the display element, and the applying of the third driving voltage to the first storage electrode of the storage capacitor are performed concurrently.

6. The method of claim 5, wherein the applying of the first aging voltage to the first gate electrode of the first transistor comprises:

applying a turn-on level voltage to the third gate electrode of the second transistor; and applying the first aging voltage to the data line.

7. The method of claim 5, wherein the applying of the second aging voltage to the anode of the display element comprises:

applying a turn-on level voltage to the fourth gate electrode of the third transistor; and applying the second aging voltage to the sixth electrode of the third transistor.

8. The method of claim 5, wherein the first transistor is configured to control a magnitude of a driving current flowing to the display element in response to a gate-source voltage.

9. The method of claim 5, wherein the first gate electrode is above the semiconductor layer, and at least partially overlaps a channel area of the semiconductor layer, and wherein the second gate electrode is between the first gate electrode and the channel area of the semiconductor layer, and at least partially overlaps channel area of the semiconductor layer.

* * * * *